May 24, 1955  P. B. CAMP  2,709,067
BRAKE OPERATING MECHANISM
Filed July 17, 1950  4 Sheets-Sheet 1
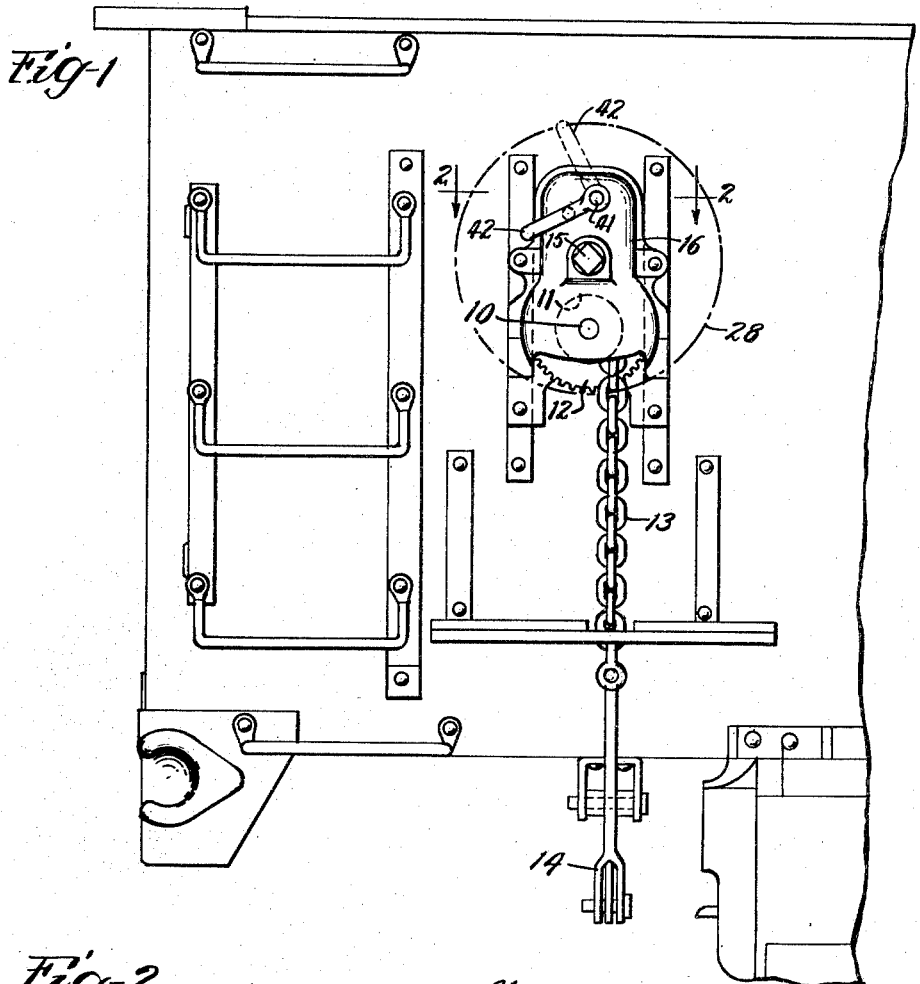
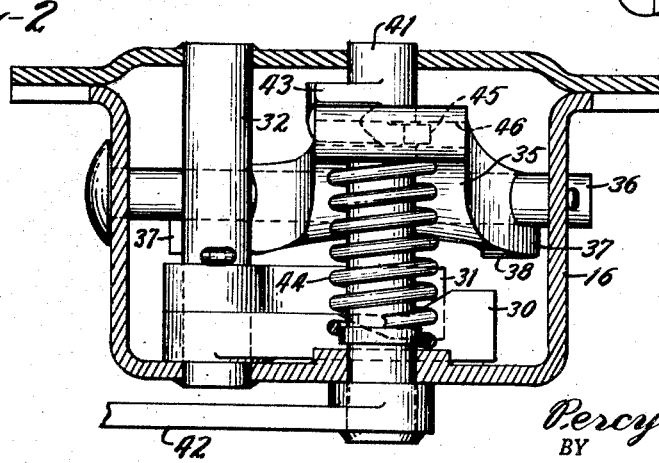
INVENTOR.
Percy B. Camp
BY
Mann and Brown
Attys.

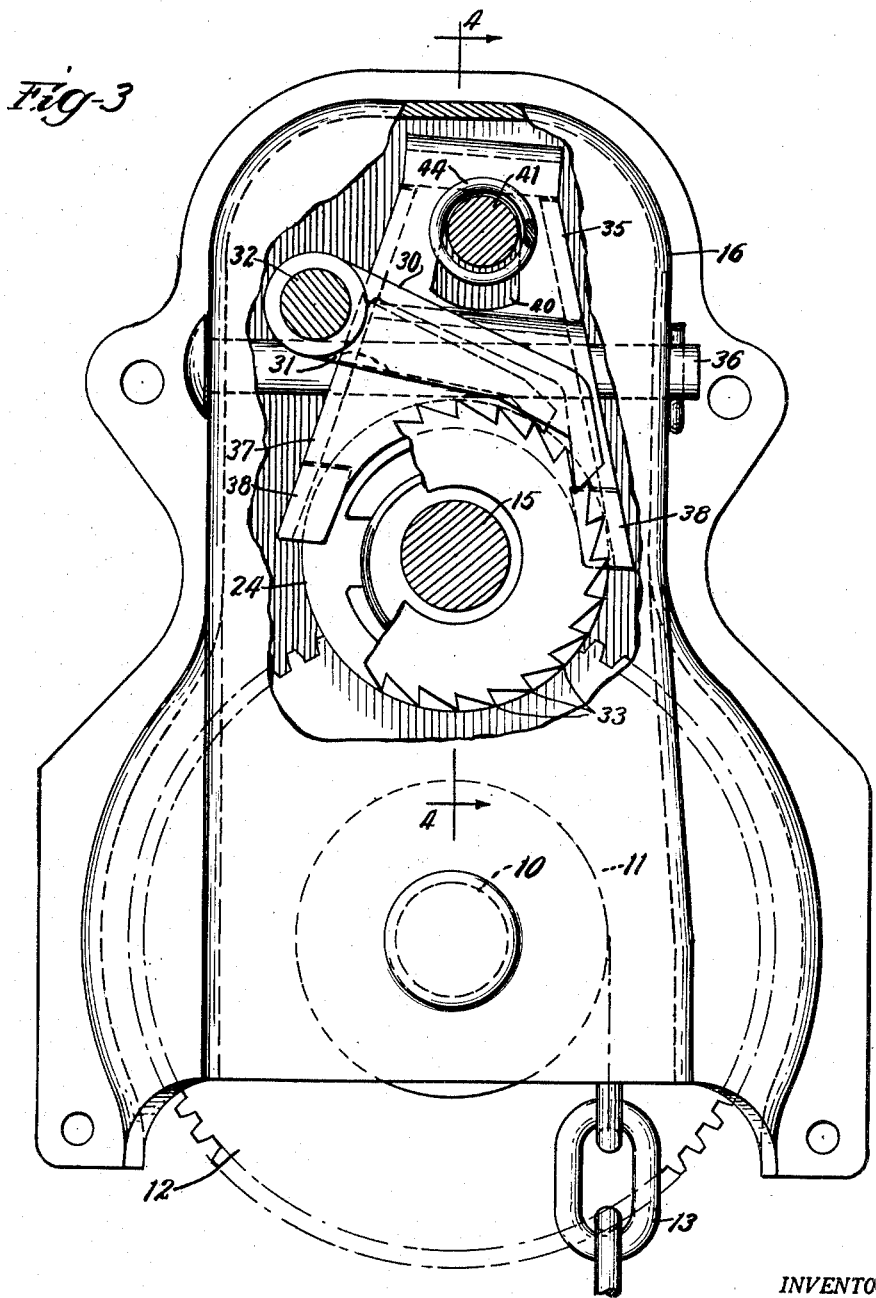

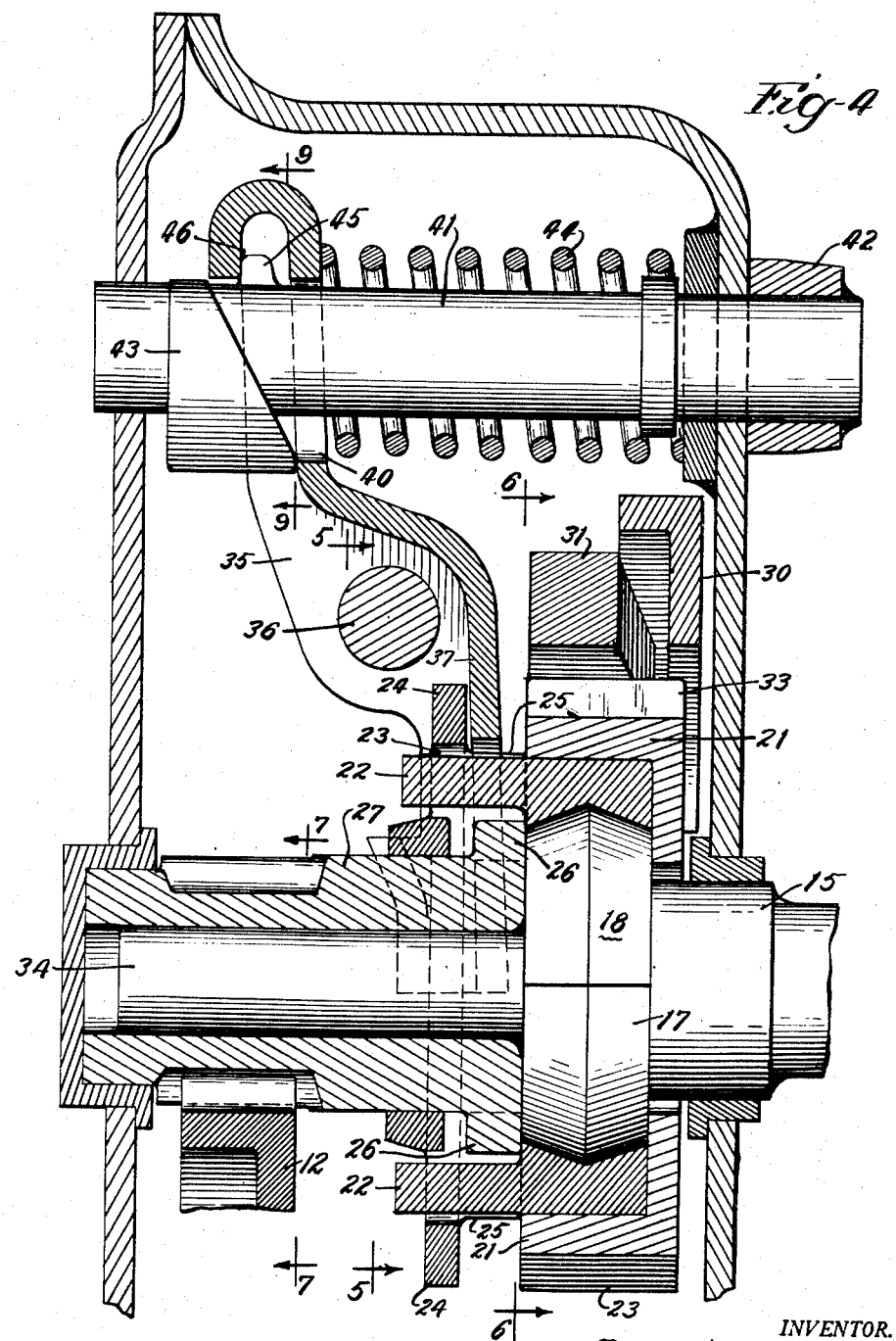

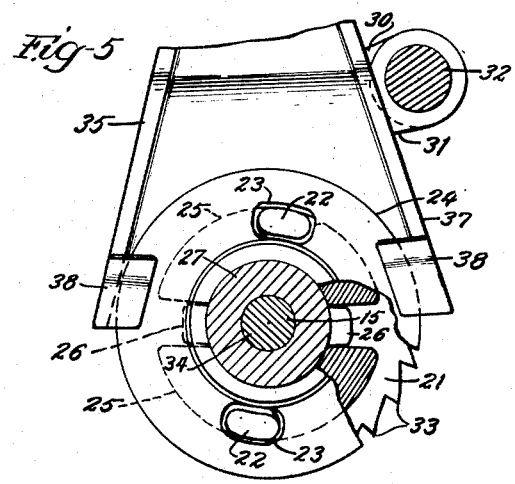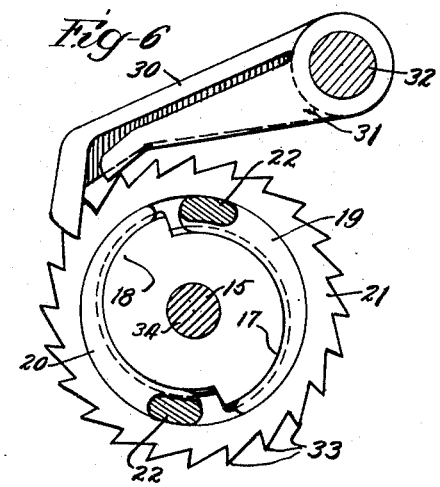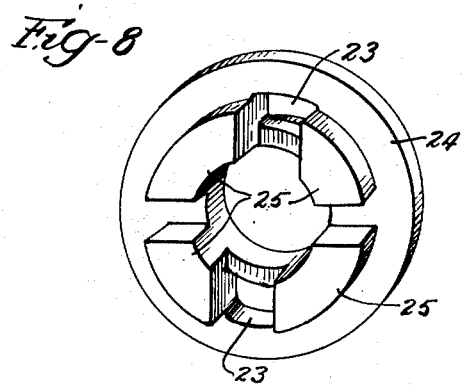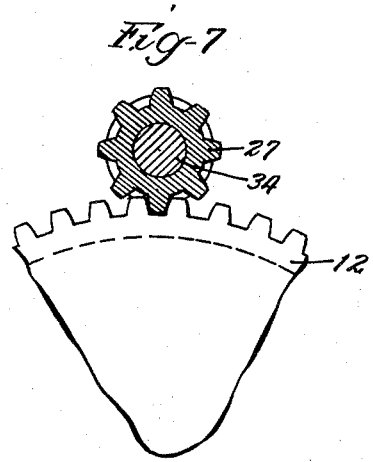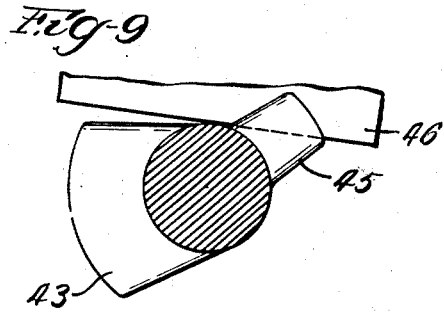
INVENTOR.
Percy B. Camp.
BY
Mann and Brown
Attys.

United States Patent Office 2,709,067
Patented May 24, 1955

2,709,067

BRAKE OPERATING MECHANISM

Percy B. Camp, Maywood, Ill., assignor to Universal Railway Devices Company, a corporation of Delaware Application July 17, 1950, Serial No. 174,273

5 Claims. (Cl. 254—149)

This invention supplements the Brake Operating Mechanism of my Patent No. 2,416,251, February 18, 1947, which includes a railway brake mechanism, an actuating means, and clutch means for operatively connecting the actuating means with the brake mechanism; and the principal object is to provide a quick release for the brake mechanism without spinning the actuating means, including a hand wheel.

In this preferred embodiment, a quick release clutch is placed between the cam clutch and the brake mechanism of said patent, which may be operated to release a driving pinion of the brake mechanism from the hand wheel shaft, and therefore the hand wheel, leaving them to stand still while the brake mechanism releases quickly.

Further objects and advantages of the invention will appear as the disclosure proceeds and the description is read in connection with the accompanying drawings, in which:

Fig. 1 is a diagram of brake operating mechanism embodying the invention applied to the end of a gondola car;

Fig. 2 is a horizontal section on the line 2—2 of Fig. 1;

Fig. 3 is an enlargement of the brake operating mechanism shown in Fig. 1 with the outer portion of the casing broken away;

Fig. 4 is a vertical section on the line 4—4 of Fig. 3;

Figs. 5, 6, and 7 are sectional views taken on the lines 5—5, 6—6, and 7—7, respectively, of Fig. 4 looking in the directions indicated by the arrows;

Fig. 8 is a perspective view of a clutch ring forming a part of the quick release clutch; and Fig. 9 is a section on the line 9—9 of Fig. 4.

But these drawings and the corresponding description are used for the purpose of illustrative disclosure only.

The railway brake mechanism is here illustrated as including a shaft 10 for a chain drum 11 and a main driving gear 12, by means of which the operating chain 13 is moved to actuate foundation brake gear mechanism generally represented by 14.

The actuating means is here illustrated by a brake shaft or hand wheel shaft 15 arranged parallel to the main shaft 10, both of which are journalled in a suitable casing 16.

The clutch means of this embodiment includes cams or clutch operating members 17 and 18 (Figs. 4 and 6) fast to the shaft 15 and cooperating with curved and tapered friction shoes 19 and 20 (Fig. 6) enclosed within a clutch drum 21 of angular cross-section, as shown in Fig. 4.

Each friction shoe 17 and 18 has a laterally directed arm 22 (Figs. 4, 5, and 6) which extends through a slot 23 in a clutch ring generally indicated by 24 having jaws 25 to receive and cooperate with lugs 26 on the driving pinion 27, which cooperates with the main gear 12.

While the parts are of somewhat different form from those disclosed in the mentioned patent, the operation is somewhat the same.

In order to apply the brakes by winding the chain 13 on the drum 11, the hand wheel 28, indicated in dotted lines in Fig. 1, and the hand wheel shaft 15 are rotated to the right in Figs. 1 and 3 and to the left in Figs. 5 and 6.

From the relation shown in Fig. 6, it will be apparent that said rotation will move the clutch operating cam members 17 and 18 and bring the shoes 19 and 20 into binding relation with the drum 21, to the end that the drum and the clutch ring 24 with the pinion 27 will be rotated to drive the gear 12 and wind up the chain 13.

In order to hold the brakes in applied condition, there are two pawls 30 and 31 pivoted to a shaft 32 in the casing 16 and cooperating with ratchet teeth 33 on the outer surface of the drum 21, which thereby becomes a drum for the cam clutch and a ratchet wheel for the holding means.

In order to release the brakes gradually or slack them off, the hand wheel 28 is rotated to the left in Figs. 1 and 3 and to the right in Figs. 5 and 6, which effects a loosening of the binding relation between the friction shoes 19 and 20 and the drum, permitting the tension in the brake mechanism to rotate the shaft 10 and related parts. Each partial rotation of the hand wheel to the left in Figs. 1 and 3, and to the right in Figs. 5 and 6, will be followed by a corresponding rotation of the friction shoes, which will again effect a binding relation, so that the brakes can be released gradually or partially without the brakeman losing control of the wheel or being put under any dangerous strain.

In order to provide for a quick release of the brakes, the clutch ring 24 is shifted to the left in Fig. 4 to disengage the jaws 25 from the lugs 26 on the pinion 27. This immediately frees the pinion 27 to rotate on the projection 34 of the shaft 15 and allow the brake mechanism to effect complete release.

The clutch ring 24 is shifted by a bent lever 35 fulcrumed on a shaft 36 mounted in the casing 16 and provided with spaced arms 37 straddling the clutch ring 24 and having fingers 38 grasping it.

The upper portion of the lever 35 has an opening 40 to receive a cam shaft 41 rotatably mounted in the casing 16 and provided with a hand lever 42 by which it may be thrown from one position to another. The shaft 41 is provided with a cam 43 cooperating with the upper portion of the lever 35 to throw it to the right in Fig. 4 against the pressure of a spring 44, which normally tends to hold the lever in its leftmost position and therefore the clutch ring 24 in its rightmost or engaged position.

The shaft 41 is also provided with a cam lug 45 cooperating with a shoulder 46 on the upper end of the lever 35 to lock that lever, and therefore the clutch ring 24, in engaged position.

That relationship is maintained when the hand lever 42 is in some such position as shown in Fig. 1, and the release is effected by throwing that hand lever to some such position as shown in dotted lines in Fig. 1 to rotate the shaft 41 and make the cam 43 swing the lever 35 to the right in Fig. 4 and shift the clutch ring 24 to the left out of engagement with the lugs 26 on the pinion 27.

The described arrangement may be considered as comprising a railway brake mechanism, an actuating means, a holding means, a cam clutch, and another clutch connecting those three parts together with means for releasing the other clutch. In this preferred embodiment, the cam clutch and the associated jaw clutch are on the brake operating or hand wheel shaft and work in series.

The jaw clutch is normally engaged and held so by the projection 45 on the cam shaft 41. The cam clutch promptly develops friction upon rotating the hand wheel to the right, thereby producing application of the brakes, during which the ratchet teeth 33 run under the pawls 30 and 31, and one of them is always in position to check promptly any reverse rotation tending to release the brakes. That release can be effected gradually and partially or totally at will by reverse rotation of the hand wheel. Release can also be effected quickly by throwing the hand lever 42 to the right in Fig. 1 to open or release the jaw clutch and free the pinion 27 from the shaft and the holding means.

I claim:

1. A hand brake mechanism for applying the foundation brake gear of a railway car, or the like, which gear includes a flexible tension member, said mechanism comprising a support casing, brake-actuating means including a manually rotatable drive shaft journalled in the casing, a rotatable drum also journalled in the casing and upon which said flexible member is adapted to be wound, power-transmitting mechanism between said actuating means and said drum for rotating the latter toward brake-applying position when the drive shaft is rotated in a forward direction, said power-transmitting mechanism including a step-release cam clutch and a quick-release clutch operatively connected in series, means including said drive shaft for operating said cam clutch to effect step-release of the brake gear by reverse rotation of said drive shaft, and independent means for actuating the quick-release clutch.

2. A hand brake mechanism as set forth in claim 1 in which said step-release clutch includes a clutch drum, a rotatable driving member interiorly mounted within said clutch drum and having a cam-shaped operating surface, and a tapered friction shoe between said operating surface and said clutch drum.

3. A hand brake mechanism as set forth in claim 1 in which the step-release cam clutch and the quick-release clutch are in axial alignment, and in which said cam clutch includes a driving member, a driven member and cam-operated clutch means therebetween, said driven member including a ratchet wheel, and a pawl mechanism cooperating with the ratchet wheel restraining retrograde movement of said driven member.

4. A hand brake mechanism as set forth in claim 1 in which said cam clutch and quick-release clutch are in axial alignment, said cam clutch including a clutch drum, a rotatable driving member interiorly mounted in said drum and having a cam-shaped operating surface, a tapered friction shoe between the driving member and said drum for transmitting rotary motion between the driving member and the driven member when the former is rotated in a forward direction, holding means restraining retrograde movement of the driven member, said quick-release clutch including a clutch ring having a plurality of lug-engaging surfaces peripherally spaced about said ring, said clutch ring constituting the driving member for the quick-release clutch, a pinion gear member journalled in the casing coaxially with said two clutches and having a portion extending within said clutch ring, lugs on the tapered friction shoes of the step-release clutch and on said pinion gear member cooperating with said shoulders on said clutch ring for effecting driving engagement between said two clutches, and means for shifting said clutch ring axially to disengage said quick-release clutch.

5. A hand brake mechanism as set forth in claim 4 in which said means for moving the clutch ring to disengage the quick-release clutch includes a clutch fork lever and cam means for rocking said lever to effect engagement and disengagement of said quick-release clutch.

References Cited in the file of this patent

UNITED STATES PATENTS

| | | |
|---|---|---|
| 1,153,556 | Lindstrom | Sept. 14, 1915 |
| 1,154,508 | Graumuller | Sept. 21, 1915 |
| 1,919,754 | Sejersen | July 25, 1933 |
| 1,938,885 | Wrigley | Dec. 12, 1933 |
| 2,057,761 | Bolton | Oct. 20, 1936 |
| 2,192,842 | Schat et al. | Mar. 5, 1940 |
| 2,492,080 | Williams | Dec. 20, 1949 |
| 2,603,322 | Dunn | July 15, 1952 |